Sept. 17, 1935.  A. D. MacLEAN ET AL  2,014,577
PRESSURE REGULATOR
Filed Aug. 19, 1930   2 Sheets-Sheet 2
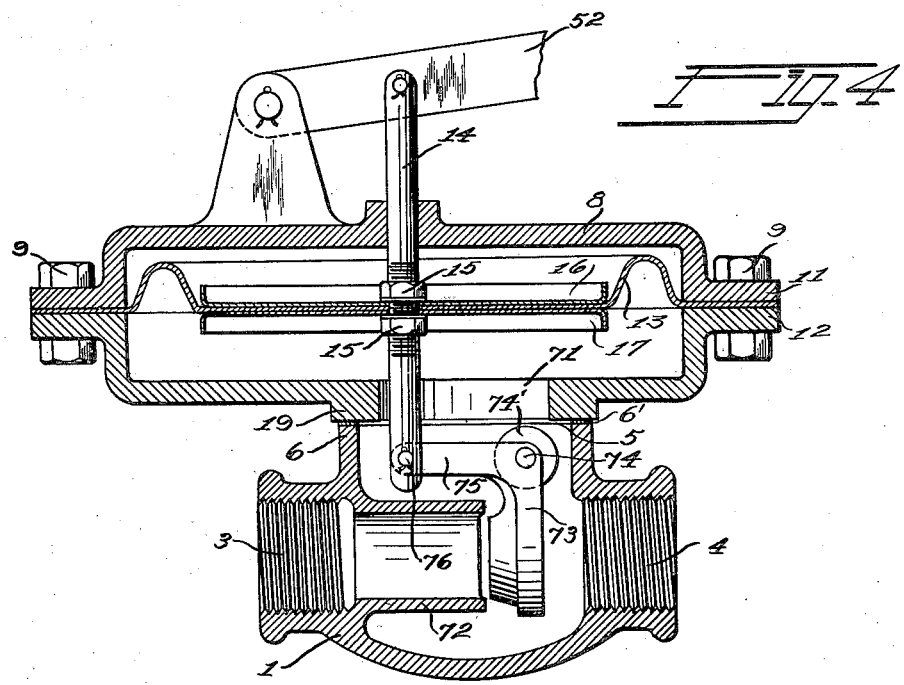
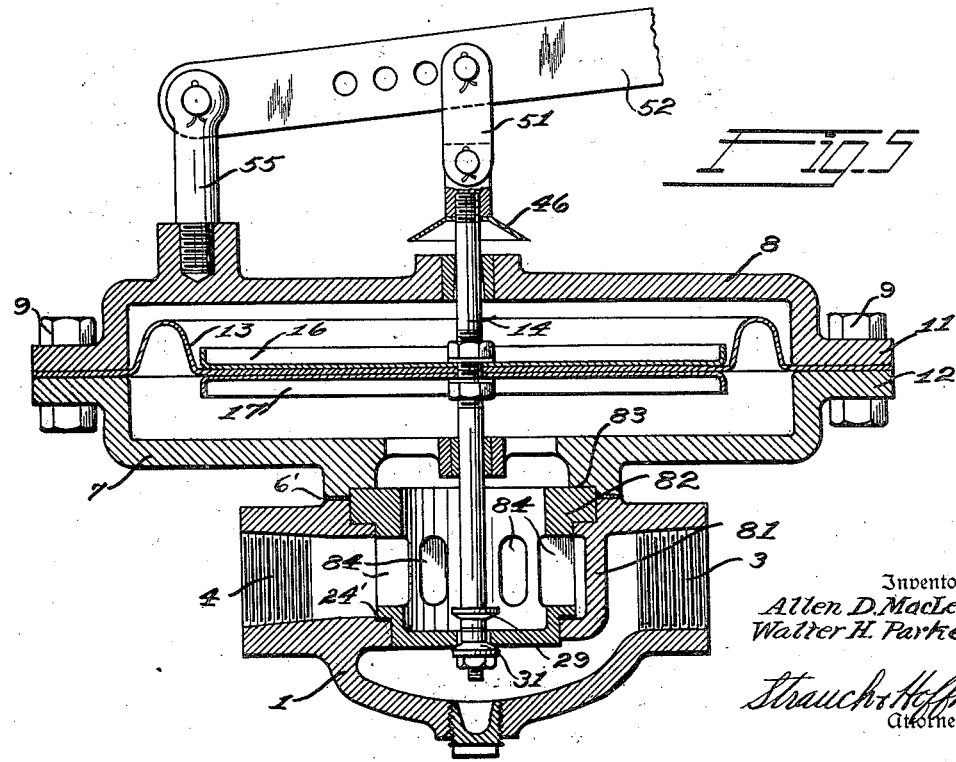
Inventor
Allen D. MacLean
Walter H. Parker
Strauch & Hoffman
Attorneys Patented Sept. 17, 1935

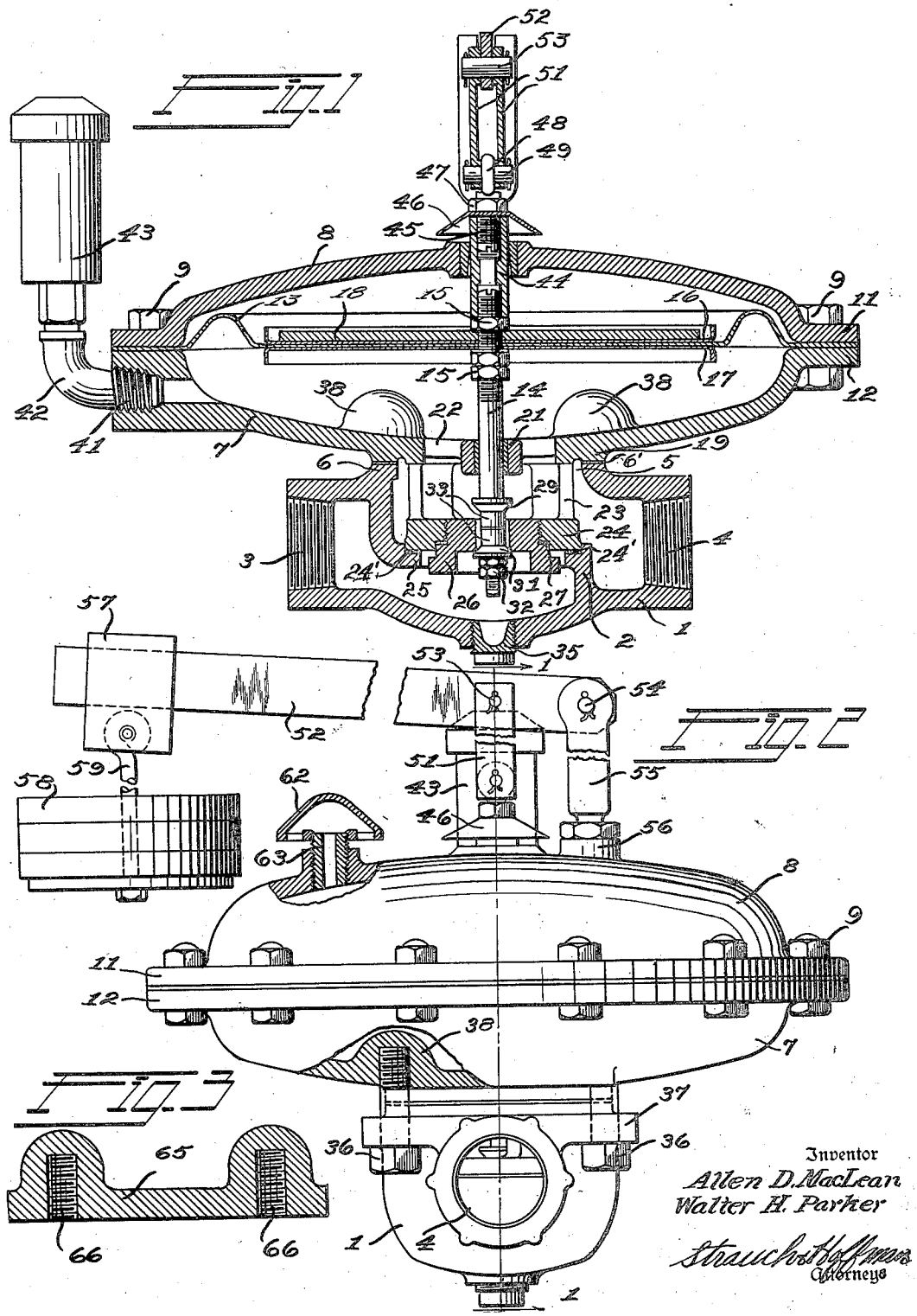

2,014,577

UNITED STATES PATENT OFFICE 2,014,577

PRESSURE REGULATOR

Allen D. MacLean, Wilkinsburg, and Walter H. Parker, Pittsburgh, Pa., assignors to Pittsburgh Equitable Meter Company, Pittsburgh, Pa., a corporation of Pennsylvania Application August 19, 1930, Serial No. 476,418

5 Claims. (Cl. 50—27)

This invention relates to a pressure regulator and more particularly to a regulator adapted to maintain a constant pressure in a service main or pipe of a gas distributing system.

In the distribution of gas to the various consumers it is necessary that the pressure of the gas in the consumers' lines be maintained within rather close limits, usually about four ounces of pressure being maintained in these lines. However it is not practical for the gas companies to maintain this low pressure in the main conduits of the system and therefore it is usual practice to provide pressure regulators interposed between the main distributing lines and the consumers' lines for maintaining a constant pressure in the consumers' lines. These pressure regulators are quite frequently positioned at rather inaccessible points where they are subject to severe usage for long periods of time without careful servicing thereof or checking of the mechanism. Furthermore, due to the large number of distribution lines of the various gas companies, it is necessary that a great number of these regulators be employed. Therefore, these pressure regulators must be reliable in their operation with little attention, and yet should be relatively cheap to manufacture since a great number of them are used.

One object of our invention therefore is to provide an improved regulator for use between the main gas lines and the consumers' lines of a gas distribution system, that is thoroughly reliable in its operation, accurate in its adjustment of pressures, and will maintain its accuracy over long periods of time without servicing.

Another object of our invention is to provide a regulator of the above described type which may be serviced when necessary with a minimum of labor and in the shortest possible time.

Since these gas pressure regulators are interposed directly in the consumer's line, service of gas to the consumer is usually interrupted when it is necessary to service the regulator, such as to re-grind or re-face the valve and the valve seat. This is frequently a serious disadvantage, since in many cases the consumer must have a constant supply of gas for 24 hours and interruption to the service is quite inconvenient. In some cases it has been necessary to resort to a parallel conduit arranged around the regulator, which can be opened when it is necessary to disconnect the regulator for servicing the same.

Another object of this invention therefore is to provide a pressure regulator for interposition between a gas main and a consumer's line that may be serviced without disconnecting the entire regulator from the service line, and one in which the service to the consumer need not be interrupted during the period of servicing the regulator.

A further object of this invention is to provide a pressure regulator in which the valves and valve seats may be readily disassociated from the valve casing by the removal of four cap screws, said cap screws serving to connect the main valve casing positioned in the service line, with the regulator or diaphragm casing.

A further object of this invention is to provide a pressure regulator having a valve casing and a diaphragm casing detachably secured together, the diaphragm casing carrying the valves and valve seats for the valve casing, these members being removable from the valve casing when the diaphragm casing is detached.

A further object of this invention is to provide a pressure regulator in which the flow controlling valve mechanism is carried by the diaphragm casing and is removable from the valve casing through an opening therein, the diaphragm casing and the valve casing being in direct communication by way of the opening through which the valve mechanism is positioned in the valve casing.

These and various other objects of our invention will be apparent from the following description and the appended claims when taken in conjunction with the accompanying drawings, wherein—

Figure 1 is a sectional view through one form of our improved pressure regulator and taken substantially on line 1—1 of Figure 2.

Figure 2 is an end elevation of the regulator shown in Figure 1.

Figure 3 is a sectional view showing the cover member adapted to be secured to the valve casing of our regulator when the valves thereof are being serviced.

Figures 4 and 5 are sectional views of slightly modified forms of our invention.

Referring to Figures 1, 2 and 3, there is provided a main valve casing 1 having an interior dividing wall 2 for separating the inlet opening 3 from the outlet opening 4. The valve casing 1 has an opening 5 in the upper wall thereof defined by an annular flat surface 6.

A removable diaphragm casing is adapted to be detachably secured to the valve casing 1 over the opening 5 therein said diaphragm casing having flat surfaces for cooperation with the annular surface 6 on the valve casing, with a gasket 6' for forming a fluid-tight joint.

This diaphragm casing comprises the lower section 7 and the upper section 8 secured together by machine bolts 9 clamping the outstanding flanges 11 and 12 into firm engagement, with the flexible diaphragm 13 therebetween. The diaphragm 13 separates the interior of the diaphragm chamber into upper and lower compartments, said diaphragm being secured to a vertically reciprocating valve stem 14 by locknuts 15 on said valve stem, there being pans 16 and 17 on opposite sides of the diaphragm. A weight 18 is positioned within the upper pan 16 on top of the diaphragm.

The lower portion 7 of the diaphragm chamber has an annular surface 19 for cooperative engagement with the annular surface 6 of the valve casing 1, there being a central opening defined by the annular surface 19. A central hub portion 21 is secured to the lower diaphragm chamber 7 by a spider 22, for defining a bearing for the reciprocating valve stem 14. The diaphragm chamber has integrally formed therewith a depending valve cage 23 which is adapted to be positioned within the valve casing 1 through the opening 5 therein. The valve cage 23 has a lower annular portion 24 which is adapted to be seated against a shoulder 25 formed on the partition wall 2 of the valve casing, with a gasket 24' therebetween. The valve cage 23 is adapted to receive a removable valve seat 26, said valve seat being screw-threadedly engaged with the cage, a gasket 27 being interposed between corresponding shoulders on the valve cage and the valve seat. The valve rod 14 extends downwardly through the valve seat 26 and has two oppositely facing valve members 29 and 31 secured thereon by locknuts 32, with spacing washers 33 between said valve members. These valve members 29 and 31 are adapted for seating engagement on opposite sides of the valve seat 26.

A removable threaded plug 35 is provided in the bottom of the valve casing 1 by means of which any collected sediment in the bottom of the valve casing may be drained off. The valve casing 1 and the diaphragm casing formed by the members 7 and 8 are secured together by cap screws 36, which pass through openings in an outstanding flange 37 on the valve casing 1 and engage in threaded knobs 38 on the lower portion 7 of the diaphragm chamber. The diaphragm chamber is further provided with a threaded opening 41 for the reception of an elbow 42 to which is removably secured a safety valve or vent assembly 43 for relieving excess pressure from the lower half of the diaphragm chamber.

A sleeve 44 is threadedly engaged with the upper end of the valve rod 14 and extends upwardly through a central opening in the upper portion 8 of the diaphragm chamber. The sleeve 44 is adapted to receive in its upper end the lower threaded shanks of an eye-bolt 45, there being a conical rain shield 46 secured against the end of the sleeve 44 by a locknut 47. The eye 48 of the eye bolt 45 is adapted to receive a pin 49, upon which is pivotally secured the lower end of links 51. The upper end of the links 51 extend on opposite sides of a lever 52 connected thereto by a pin 53. The lever 52 is pivoted on a pin 54 mounted at the upper end of a rigid upright member 55 removably secured to a lug 56 on the upper casing member 8. The opposite end of the lever 52 is adapted to receive an adjustable weight supporting block 57 having the weights 58 suspended thereon by the eye bolt 59.

The upper casing 8 of the diaphragm chamber is provided with a vent cap 62 which is shaped to prevent entrance of rain into the diaphragm chamber, said vent cap 62 being screw-threadedly engaged with a nipple 63 which is threaded into a corresponding opening in the upper chamber 8.

As seen in Figure 3, a cover member 65 is furnished with each of the regulators, said cover member having a plurality of threaded openings 66 spaced so that the threaded ends of the cap screws 36 may engage therewith. When the diaphragm chamber is removed from the valve chamber the cover 65 may be positioned thereon and secured by the cap screws 36 so that service to the consumer need not be interrupted while the valve and valve seat are being serviced.

The operation of the embodiment of our invention as thus described is as follows. With the parts assembled as shown in Figures 1 and 2, and the inlet service pipe connected at 3 and the outlet service pipe connected at 4, the diaphragm 13 assumes a position dependent upon the adjustable weights 58 and dependent upon the pressure in the low pressure side of the service main. It will be noted that the upper portion of the valve chamber casing 1 is in direct communication with the diaphragm chamber beneath the diaphragm thereof by way of the central opening 5 in the valve casing and the corresponding opening in the lower half 7 of the diaphragm chamber. Thus it is unnecessary to provide an additional pipe connecting the low pressure side of the service main with the diaphragm chamber. Furthermore it is unnecessary to provide packing means around the reciprocating valve stem 14, whereby the regulator is extremely sensitive to small pressure changes. The pressure from the low pressure side of the valve casing is therefore transmitted to the lower half of the diaphragm chamber, and the upper half of the diaphragm chamber is subjected to atmospheric pressure by way of the vent cap 62. The valves 31 and 29 regulate the passage of fluid through the valve seat 27 in a well known manner.

When it becomes necessary to service the valve or the valve seat, the cap screws 36 are removed and the entire diaphragm casing is disconnected from the valve casing 1. As seen clearly in Figure 1, the valve cage 23 is of such diameter that it may be readily withdrawn from the valve casing 1 through the opening 5 thereof and the entire valve and its assembly are thus removed when the diaphragm casing is separated from the valve casing. The cover member 65 may then be positioned on the valve casing and secured thereto by the cap screws 36 and service may at once be resumed in the service mains. Thus the time of interruption of flow of fluid to the consumer is very short, being only sufficiently long to loosen the cap screws 36, remove the diaphragm casing, and replace the cover member 65.

Due to the fact that the entire valve cage, valve seat, and valve are removed with the diaphragm chamber these parts may be readily serviced. If desirable, the removable valve seat 26 may be quickly replaced with a similar valve seat and the valves 29 and 31 may also be quickly replaced if necessary.

When the valve seat 26 is replaced on the cage 23, the washers 27 will be so tightened as to maintain a tight joint between these two members. When the diaphragm chamber is reassembled with the valve casing, the gasket provided between the shoulder 25 of the valve casing and the spider 23, and the gasket between the annular shoulder 6 of the valve casing and the annular surface 19 will be compressed by tightening up on the cap screws 36.

This regulator is particularly designed for outdoor service where it is exposed to rain or snow. The rain shields 45 and 62 effectively prevent entrance of rain to the diaphragm chamber without the necessity of providing a packed joint for the valve stem, thus further insuring that the regulator is sensitive to small pressure changes.

In the modified form of our invention shown in Figure 4, similar reference characters indicate similar parts to those shown in Figures 1–3, some of the detailed construction being omitted for the purposes of clearness. In this form of our invention the valve seat is not removable from the valve casing, but the movable valve which cooperates with said seat is removable when the diaphragm chamber is removed. The diaphragm chamber formed from the two casings 7 and 8 has the annular surface 19 for cooperation with the annular shoulder 6 of the valve casing 1, with a gasket 6' interposed therebetween, the casings being secured together in a manner similar to that shown in Figure 1. The reciprocating valve rod 14 passes freely through an enlarged central opening 71 in the lower portion 7 of the diaphragm chamber, said opening being positioned above the opening 5 in the valve casing.

The valve casing 1 has an integral tubular member 72 extending inwardly from the inlet or high pressure entrance 3, the inner end of said member 72 forming the valve seat for a pivoted valve member 73. Valve member 73 is formed as a bell crank lever, which is pivoted on the pin 74 mounted in the upper portion of the valve casing 1. The arm 75 of the removable valve 73 is pivoted to the lower depending end of the reciprocating valve rod 14 by a pin 76.

The pivot pin 74 upon which the removable valve 73 is mounted is an extension of a threaded plug 74' removably threaded into the side wall of the valve casing 1, and has the pintle portion 74 thereof positioned within the valve casing, upon which the valve member 73 is pivoted.

When it is necessary to service the valve or the valve seat in this form of our invention, the diaphragm is removed in a similar manner to that described in connection with Figures 1–3. After the bolts holding the two casings together have been loosened, the pivot pin 74 is removed from the side of the valve casing 1, thus freeing the pivoted valve member 73. When the diaphragm casing is removed or separated from the valve casing the valve member 73 is passed through the opening 5 in the valve casing. If the valve seat needs re-grinding the grinding tool may be inserted through the open top 5 of the valve casing, and if the valve 73 needs re-facing such operation may be readily accomplished. In re-assembly, the two casings are positioned together with the gaskets therebetween and the plug 74' is re-threaded in position with the pivot pin 74 inserted through the side wall of the casing 1 to engage with the bell crank valve 73.

In the form shown in Figure 5 the valve cage is removable from the valve casing with the diaphragm casing but said valve cage is not integral with the lower section of the diaphragm casing as in Figures 1–3. In this form of our invention wherein similar reference characters are utilized to indicate like parts hereinbefore described, the valve casing 1 is provided with an interior partition 81 with a central lower opening therein. The valve cage 82 of this form of our invention is positioned within an annular slot 83 of the lower section 7 of the diaphragm casing, said valve cage having a close fit against the shoulder 83. The engagement between the chamber 7 and the valve cage 82 is of such a nature that these parts are readily removable and handled as a unit, and yet they may be separated when necessary. This engagement may be such that the friction is sufficient to maintain the parts in position, or in some cases the valve cage may be threadedly engaged with the lower portion 7 of the diaphragm chamber.

The valve cage extends downwardly into the valve casing 1, and is provided with a plurality of ports 84 in the side walls thereof, suitable packings or gaskets being provided between the seating surfaces. The removable valves 29 and 31 control passage of fluid from the high pressure entrance conduit 3 to the lower pressure conduit 4.

Servicing of this form of our invention is accomplished as follows. When the means holding the diaphragm casing to the valve casing are removed, said means being similar to the cap screws 36 shown in Figures 1 to 3, these two casings may be separated. When this separation takes place the valve cage 82 is removed with the diaphragm casing due to the frictional fit between the portion 83 of the chamber 7 and the valve cage 82. Therefore, the valve cage and the valve are removed with the diaphragm chamber. A cover member such as shown in Figure 3, may then be positioned over the valve casing, and the flow of fluid may be continued while servicing of the valve is taking place. This form of our invention has the advantage of removability of the valve cage, whereby such cage may be more readily ground and serviced and may be replaced if necessary by a new cage. If the valve cage becomes worn such that it must be discarded, the lower half of the diaphragm chamber 7 need not be discarded since the valve cage is removable therefrom and a fresh valve cage may be inserted.

In all of the forms of our invention as described, it will be noted that it is unnecessary to provide packing means around the reciprocating valve rod, since the diaphragm chamber and the valve chamber are in direct communication. Therefore the regulator is more sensitive to slight changes in pressure due to the elimination of the usual packing glands around the valve rods.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. A pressure regulator comprising a valve casing having an opening in one wall thereof, a diaphragm casing having an opening in one wall thereof and removably secured to said valve casing with said openings in registration, a pressure responsive element in said diaphragm casing, a valve cage carried by said diaphragm casing and extending into said valve casing, a dividing wall in said valve casing having an annular surface against which said valve cage engages, a valve seat on said cage, a reciprocating valve for cooperation with said seat and operatively connected with said pressure responsive element, and common means for securing said casings in fluid tight engagement and said valve cage in fluid tight engagement with the annular surface on said dividing wall.

2. The invention as defined in claim 1 wherein said valve cage is removably secured to said diaphragm casing.

3. A pressure regulator comprising a valve casing having an opening in the upper wall thereof, a diaphragm casing having an opening in one wall thereof and removably secured to said valve casing with said openings in registration, a diaphragm in said diaphragm casing, a valve rod secured to said diaphragm carrying a valve and extending into said valve casing, a guide bushing for said valve rod carried by said diaphragm casing, a valve cage having a valve seat thereon carried by said diaphragm casing, a dividing wall in said valve casing having a surface against which said valve cage engages and means for securing said diaphragm casing and said valve casing in fluid tight engagement with the valve cage in fluid tight engagement with said surface on the dividing wall.

4. The invention as defined in claim 3 wherein said valve cage is integral with said diaphragm casing.

5. A pressure regulator comprising a valve casing having a transverse inlet and outlet and an opening in the top thereof, a wall dividing the inlet and outlet and having an opening therethrough in alignment with the opening in the top, a diaphragm casing carrying a valve cage extending into said valve casing and bearing against said dividing wall, a valve seat member threaded into said cage, a diaphragm in said diaphragm casing, a valve stem connected to said diaphragm and passing through the valve seat member, and a valve member removably secured to said valve stem.

ALLEN D. MacLEAN.
WALTER H. PARKER.